United States Patent
Ricketts et al.

(10) Patent No.: US 9,313,950 B2
(45) Date of Patent: Apr. 19, 2016

(54) MULTI-PURPOSE SPREADER OF AN AGRICULTURAL VEHICLE

(71) Applicant: CNH Industrial America LLC, New Holland, PA (US)

(72) Inventors: Jonathan E. Ricketts, Coal Valley, IL (US); Craig E. Murray, Davenport, IA (US); John J. Borsdorf, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 12 days.

(21) Appl. No.: 14/491,242

(22) Filed: Sep. 19, 2014

(65) Prior Publication Data

US 2016/0081270 A1    Mar. 24, 2016

(51) Int. Cl.
*A01F 12/40*    (2006.01)
*A01D 41/12*    (2006.01)

(52) U.S. Cl.
CPC ............ *A01D 41/1243* (2013.01); *A01D 41/12* (2013.01)

(58) Field of Classification Search
CPC ... A01D 41/12; A01D 41/14; A01D 41/1243; A01F 12/40
USPC ........... 239/650, 672, 673, 682, 687; 460/21, 460/111, 112
See application file for complete search history.

(56) References Cited

U.S. PATENT DOCUMENTS

| | | | |
|---|---|---|---|
| 772,229 A | 10/1904 | Fairly | |
| 2,951,314 A | 9/1960 | Laughlin | |
| 4,483,486 A | 11/1984 | Magda | |
| 4,955,538 A | 9/1990 | Laube et al. | |
| 5,021,030 A * | 6/1991 | Halford | A01D 41/1243 239/673 |
| 5,433,664 A * | 7/1995 | Bonde | A01D 41/1243 460/111 |
| 6,238,286 B1 * | 5/2001 | Aubry | A01D 41/1243 460/111 |
| 6,295,757 B1 | 10/2001 | Fields, II | |
| 6,910,645 B1 | 6/2005 | Edwards | |
| 8,105,140 B2 | 1/2012 | Teroerde et al. | |
| 8,820,758 B2 | 9/2014 | Schwinn et al. | |
| 2008/0099216 A1 | 5/2008 | Pugh | |

* cited by examiner

*Primary Examiner* — Robert Pezzuto
(74) *Attorney, Agent, or Firm* — Patrick M. Sheldrake

(57) ABSTRACT

A spreader system for discharging residue from an agricultural combine to a ground surface. The spreader system including at least one rotatable member positioned to encounter the residue and to disperse the residue when in a first orientation. The at least one rotatable member having a second orientation wherein the rotatable member is configured to contact the ground and to assist in providing support to the agricultural combine when in the second orientation.

20 Claims, 5 Drawing Sheets

MULTI-PURPOSE SPREADER OF AN AGRICULTURAL VEHICLE

BACKGROUND OF THE INVENTION

1. Field of the Invention

The present invention relates to a system and method for a dual use of the spreader mechanism of a harvesting system.

2. Description of the Related Art

In common harvesting operations where a combine is used to cut or pick up crop while traveling through a field, it is generally desired to leave the residue in a compact windrow for eventual pickup, or to evenly distribute the residue or MOG (material other than grain) evenly across the entire cut width. Returning the material to the ground provides nutrients for future crops. It is important that MOG be spread evenly such that all future plants have a consistent seed bed, but also because bunched or thicker distribution of straw and chaff, the residue or MOG, can make future field operations more challenging.

During the spreading of crop residue onto a field, a spreader performs only a spreading function and that function may be not used in the event the residue is left in a windrow for later gathering. This means that the spreading function is carried out with a dedicated system. Combines are now situated to carry more and more systems many of which can only perform one useful function.

The problem is that larger combines are becoming too heavy to traverse roads and highways legally. The weight of combines has increased due to needing heavier structures to carry larger headers and with increased volumes of grain in the grain tanks.

What is needed is a system and method for optimization of residue spreading so that the residue may be spread evenly onto the field and that the spreading system serve multiple purposes including support of the weight of the combine.

SUMMARY OF THE INVENTION

Embodiments of the present invention provide a system and method to spread the residue onto a field from a combine and to provide ground contacting support while in a transport mode.

The invention in one form is directed to a spreader system for discharging residue from an agricultural combine to a ground surface. The spreader system including at least one rotatable member positioned to encounter the residue and to disperse the residue when in a first orientation. The at least one rotatable member having a second orientation wherein the rotatable member is configured to contact the ground and to assist in providing support to the agricultural combine when in the second orientation.

The invention in another form is directed to an agricultural harvesting system including a chassis, a plurality of ground support devices carrying the chassis and a threshing section carried by the chassis. The threshing section produces an agricultural residue. There is a spreader system for discharging the residue to a ground surface. The spreader system includes at least one rotatable member positioned to encounter the residue and to disperse the residue when in a first orientation. The at least one rotatable member having a second orientation wherein the rotatable member is configured to contact the ground and to assist in providing support to the agricultural combine when in the second orientation.

Advantageously, the present invention has a dual purpose in that it serves as a spreader and as a transportation assisting device.

Another advantage is that the present invention reduces the overall weight of the harvester since two systems are combined into one.

Yet another advantage of the present invention is that in the event the combine becomes stuck in the field the multi-purpose spreader can be oriented to reduce the load carried on other wheels and to even provide additional traction.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
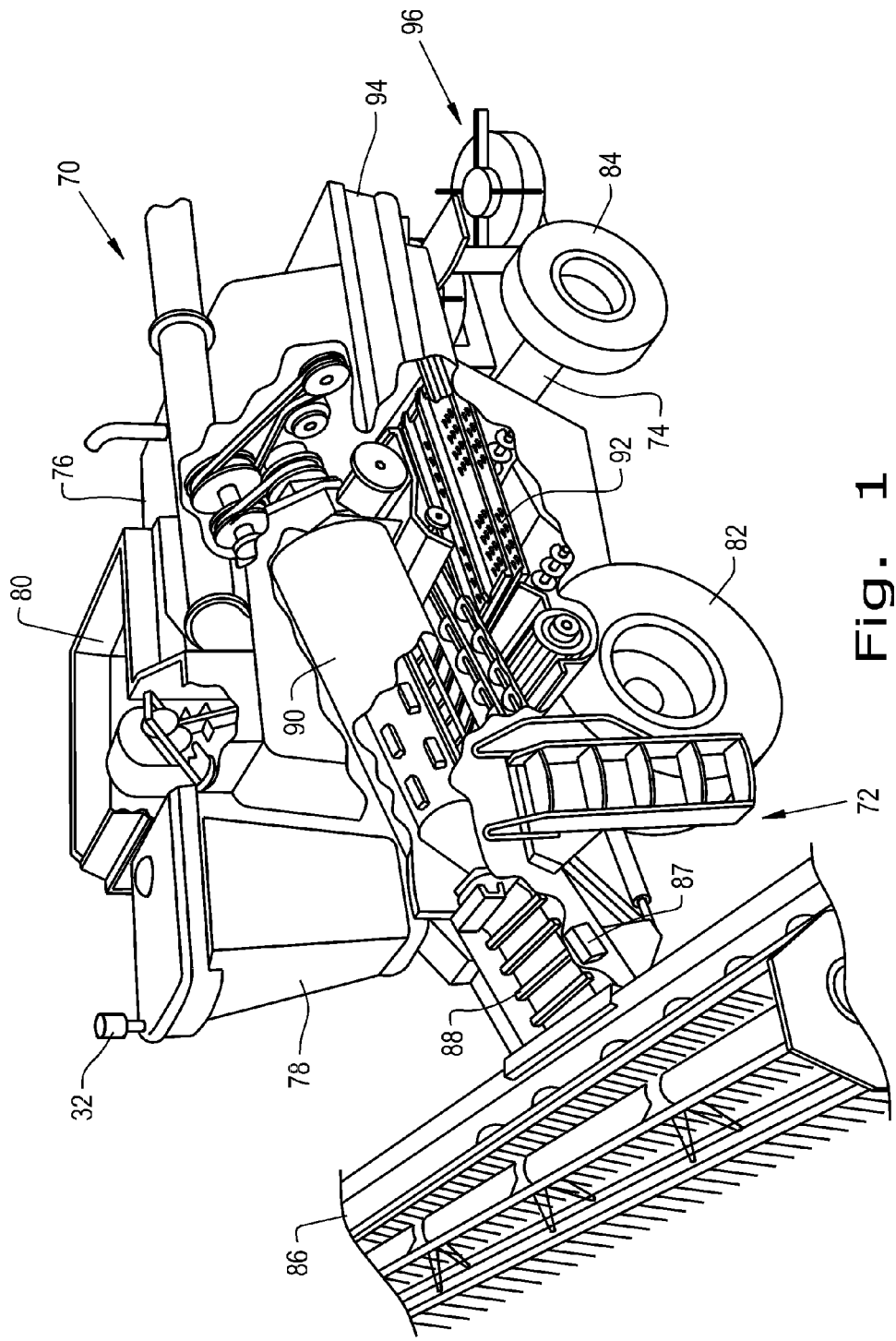
FIG. 1 illustrates a perspective view of a harvester combine with an attached header, threshing rotor, and spreader system according to one embodiment of the present invention.

Referring now to the drawings, and more particularly to FIG. 1, there is illustrated an agricultural system 70 which includes agricultural harvesting equipment such as a combine 72 which is used for harvest. Combine 72 is depicted as a mobile agricultural work vehicle including a chassis/frame 74, to which are installed a main body 76, an operator's station or cab 78, a grain tank 80, an engine (not shown), and ground support devices including drive wheels 82 and steerable wheels 84. However, the ground support devices could also be endless crawler tracks.

Header 86 is shown in FIG. 1, which is commonly referred to as a grain header and is typically utilized for harvesting smaller grains, such as, but not limited to, wheat and soybeans. Headers such as header 86 used for this purpose can have a variety of widths, for instance, from about twenty to about forty five feet, as is well known. Another well known header is a corn header, and will typically be of a six, eight, twelve or sixteen row variety, and will have an overall width of from about fifteen to about forty feet. Header 86, as well as other headers (not shown), are configured to be interchangeably mounted on the front end of a feeder 88 of combine 72 in the well-known, conventional manner, for configuring combine 72 for harvesting a particular crop. A header detector 87 is also shown in FIG. 1, as connected on the combine 72.

The crops harvested by a header 86 will be gathered up by header 86 and conveyed by feeder 88 rearwardly and upwardly into the body of combine 72, for processing by a threshing system. The threshing system comprises a thresher 90, which is located within main body 76 and is disposed to receive the crop materials from feeder 88. Thresher 90 separates kernels of grain from larger pieces of other crop materials, referred to herein as MOG (materials other than grain). The grain kernels are then conveyed to a winnowing, or cleaning section 92, where smaller bits of MOG, debris, dust, etc. are removed by mechanical agitation and a stream of air. Although combine 72 is depicted as an axial-flow combine (i.e., having a threshing system with a generally longitudinally disposed axis of rotation), the concepts described herein may also be used on other types of combines including those having threshers with transversely disposed axes of rotation.

Quite often a machine of this nature must harvest additional material other than the main product in order to complete the separation process. The excess material or MOG (herein also referred to as crop residue, or simply as residue) is typically chopped or shredded and propelled from the rear 94 of the combine 72 by way of spreader 96.

Attached on combine 72 is a sensing device 32, as shown or similarly, on or about spreader 96 for detecting attributes that can be used to optimize the residue spreading function of spreader 96 of the combine 72. Sensing device 32, may be a direction detector 32, such as a GPS system, sensing device 32 can also be configured to detect wind speeds. Sensing device 32 can also be connected to agricultural system 70 at a variety of other locations, and particularly to a communication and control system. Sensing device 32 may be a steering angle sensor to thereby detect commanded changes in direction. The sensing device 32 may be connected to the communication and control system.

Further, sensing device 32 may contain any of the sensors to sense temperature, relative humidity, barometric pressure, cloud cover, and trends thereof. The sensing device 32 may sense one or more various wind characteristics, such as wind speed and wind direction. Wind direction and speed change can reduce the harvesting machine's ability to spread the residue uniformly onto the ground surface. By using the information provided by the sensing device 32, such as wind speed and wind direction, adjustments for residue spreading may be automatically made in real time, relative to the speed and direction of combine 72 travel. The communication and control system may incorporate connection of various other sensors (not shown) in the combine 72 to receive information pertaining to combine 72 travel and the location of edges of the adjacent standing crops.

Combines equipped with a GPS may be used to determine the direction and speed of combine 72. This data may be necessary in making the necessary corrections to compensate for wind speed and direction changes of combine 72, as analyzed and determined by a controller.

Figure 2:
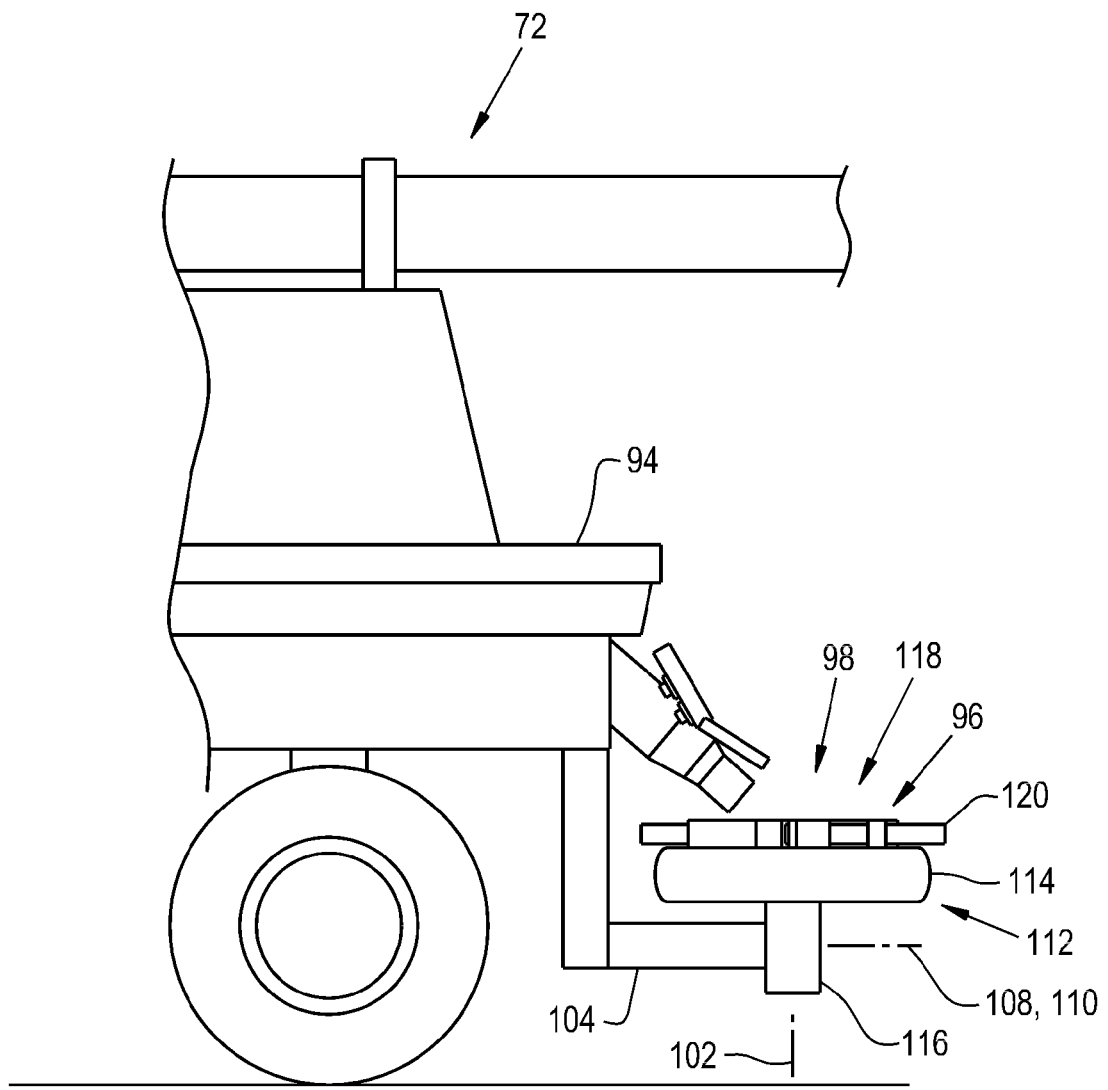
FIG. 2 illustrates a partial side view of the harvester from FIG. 1, with the spreader system in a first orientation.

Referring particularly to FIG. 2, a rear end 94 of combine 72 is shown, including a crop residue spreader system 96 operable for spreading straw, stalks, and other crop residue and MOG that has been separated from the grain of the crops by thresher 90 of combine 72 located forwardly of rear end 94. The straw, stalks and the like are propelled rearwardly by rotating beaters or the like (also not shown) from the threshing mechanism and downwardly through a rear cavity of combine 72 to spreader 96 for the spreading of the residue onto the ground.

Now, additionally referring to FIGS. 2-7, spreader system 96 includes rotatable members 98 and 100, each being rotatable about an axis, such as axis 102. Pivotal members 104 and 106 respectively support rotatable members 98 and 100 and provide a connection to chassis 76 or to frame 74, and is shown in a rather schematic fashion in FIGS. 2-5. It is also contemplated that pivotal members 104 and 106 may be directly connected to an axle assembly that is connected to wheels 82 and/or 84, to thereby provide additional support to frame 74 and chassis 76. Pivotal members 104 and 105 respectively pivot about axis 108 and 110. Axes 108 and 110 are parallel or at least generally parallel with each other and are aligned with a plane oriented in a direction of travel of combine 70. Axes 108 and 109 are generally horizontal, although other orientations are also contemplated.

Figure 3:
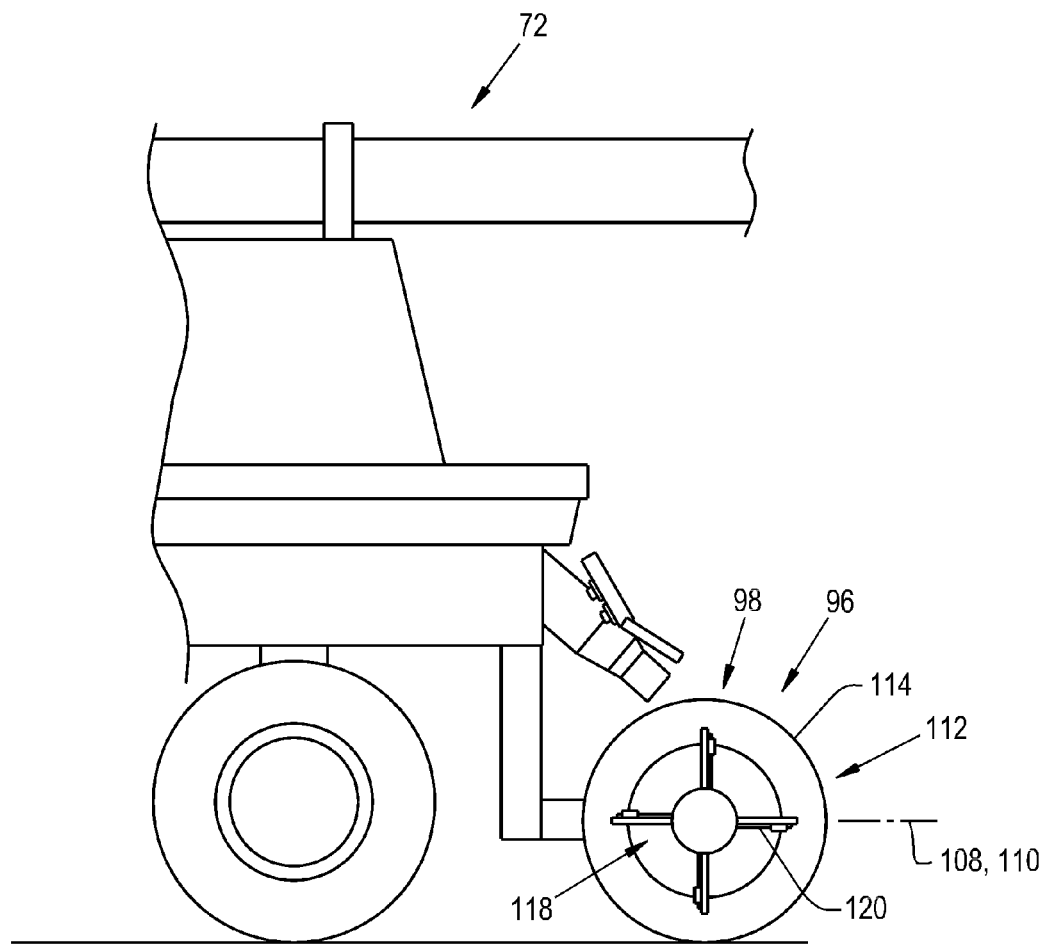
FIG. 3 illustrates another partial side view of the harvester combine of FIGS. 1 and 2, with the residue spreader system in a second orientation.
Figure 4:
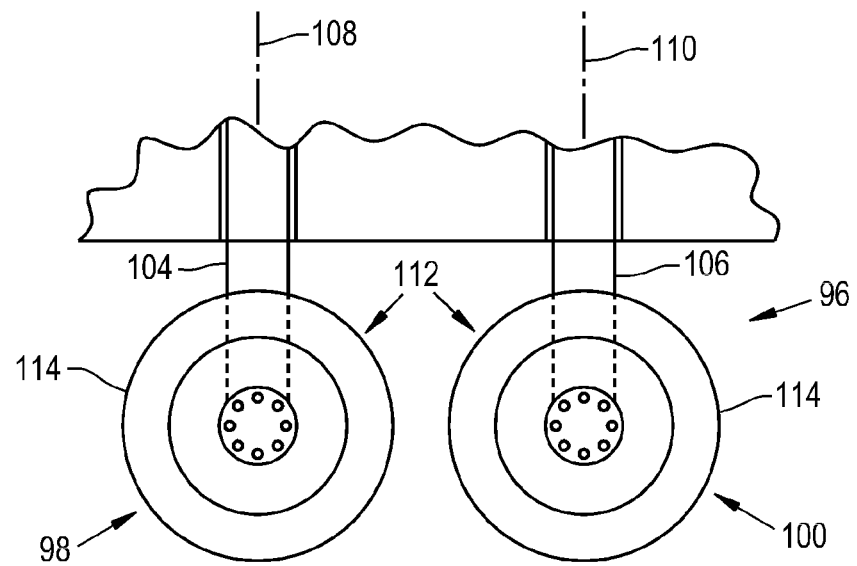
FIG. 4 is a top view of the spreader system of FIGS. 1-3, with the spreader bars not shown, to illustrate the orientation of the spreader system when in the first orientation.

Rotatable members 98 and 100 each include a wheel 112 having a tire 114 thereon, and are rotated by motors 116, which may be powered electrically or hydraulically. On a side of each wheel 112 is positioned a spreader arrangement 118, which is illustrated as four bars extending outward from the rotational center of rotatable members 98 and 100. Spreader arrangement 118 includes extendable bars 120 that are extended when in the spreader orientation and they are retracted when in the transport orientation, as can be seen in FIGS. 2 and 3. Spreader arrangement 118 also has a pivoting handle 122 that can be rotated to cause bars 120 to extend or retract depending upon the movement of handle 122. It is also contemplated to make the extension and retraction of bars 120 automatic.

While combine 72 is harvesting a crop, if the residue is to be spread onto the field then spreader system 96 is oriented as shown in FIG. 2 so that the residue will contact rotatable members 98 and 100, which are counter-rotating, to disperse the residue onto the field. When there is not a need to spread the residue, then spreader system 96 can be oriented as shown in FIG. 3 by the pivoting of pivotal members 104 and 106 about axes 108 and 110. Motors 116 can be used to provide additional drive, or they can simply freewheel, with rotatable members 98 and 100 and just providing load bearing support for combine 72.

Figure 5:
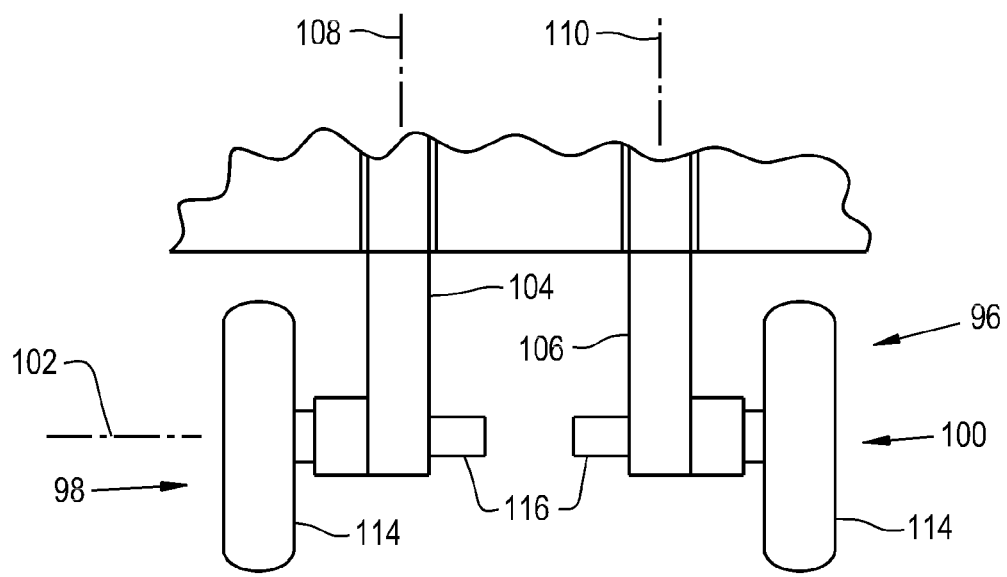
FIG. 5 is another top view of the spreader system of FIGS. 1-4, with the spreader bars not shown to illustrate the orientation of the spreader system when in the second orientation, which allows the tires to contact the ground.
Figure 6:
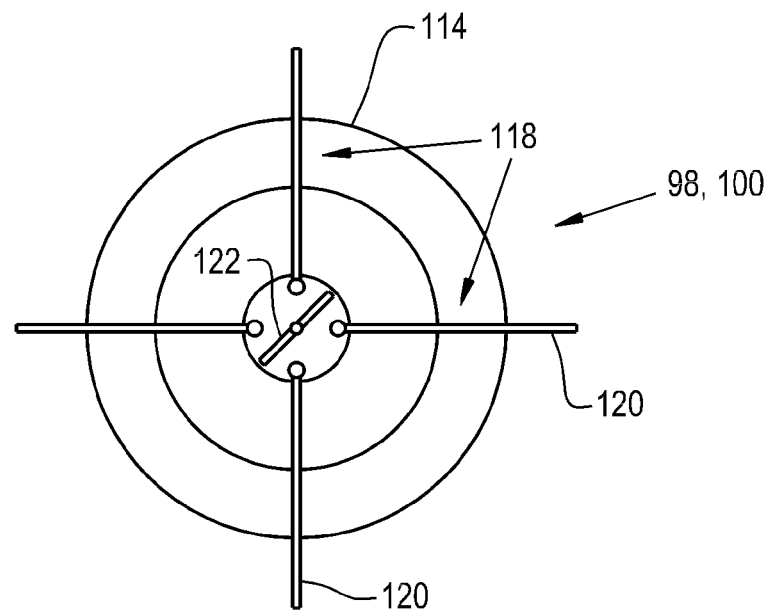
FIG. 6 is a top view of one of the wheels of the spreader system of FIGS. 1-5 with the spreader bars extended.
Figure 7:
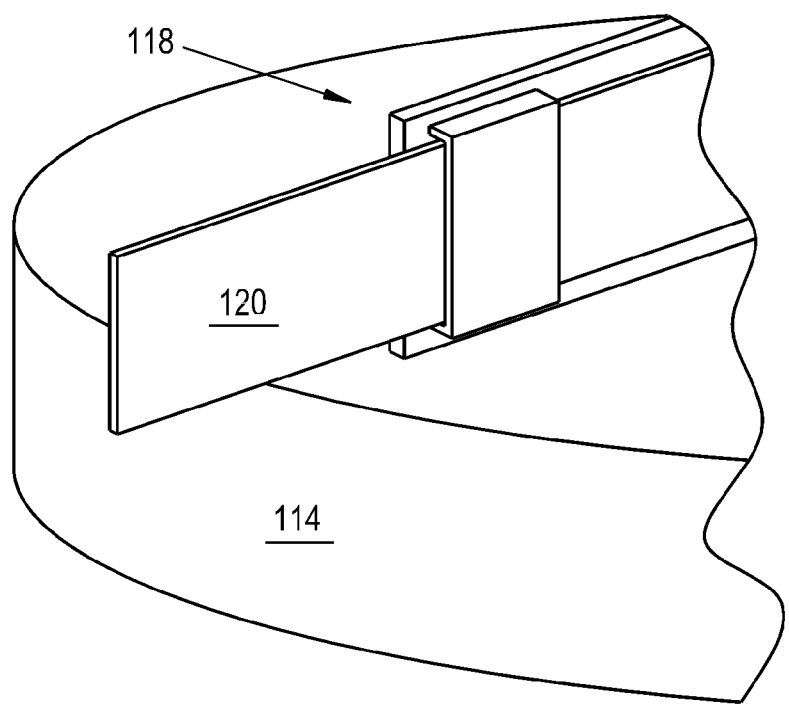
FIG. 7 is a perspective view of one of the wheels of the spreader system of FIGS. 1-6 illustrating the extendibility/retractability of the spreader bars.

The common spreader discs, of the prior art, are generally made in a disc form and may be made out of various materials. The discs are relatively light and are not capable of doing anything except the spreading of residue material from the machine. Advantageously, the present invention allows for multiple uses of the spreader system 96, in that each rotatable member 98 and 100 has a wheel 112 and tire 114 to perform an additional function. With the installation of spreader paddles in spreader arrangement 118 onto the wheel 112 and tire 114 allowing for a dual use of the system. The bat length can be varied, as shown, to extend out and retract in. The bats are retracted to allow tires 114 to contact the ground when in transport mode (FIG. 3). The spreader assembly would be mounted into the super structure of the machine and be rotatable to allow the spreader disc to rotate 90 degrees about axes 108 and 110. When in the transport orientation, as shown in FIGS. 3 and 5, wheels 112 contact the ground or road surface. Several ways are contemplated to increase the down force onto tires 114 for road transport.

While this invention has been described with respect to at least one embodiment, the present invention can be further modified within the spirit and scope of this disclosure. This application is therefore intended to cover any variations, uses, or adaptations of the invention using its general principles.

Further, this application is intended to cover such departures from the present disclosure as come within known or customary practice in the art to which this invention pertains and which fall within the limits of the appended claims.

What is claimed is:

1. An agricultural harvesting system, comprising:
    a chassis;
    a plurality of ground support devices carrying said chassis;
    a threshing section carried by said chassis, said threshing section producing residue; and
    a multi-purpose spreader system including:
        at least one rotatable member positioned to encounter the residue and to disperse the residue when in a first orientation, said at least one rotatable member having a second orientation wherein said rotatable member is configured to contact the ground and to assist in providing support to the harvesting system when in said second orientation.

2. The agricultural harvesting system of claim 1, further comprising at least one pivotable member coupling said chassis with said at least one rotatable member, the agricultural harvesting system having a general direction of travel, said pivotal member having an axis about which said pivotal member pivots, said axis being generally parallel with a vertical plane oriented in said direction of travel.

3. The agricultural harvesting system of claim 2, wherein said axis is generally horizontal.

4. The agricultural harvesting system of claim 1, wherein said at least one rotatable member includes a first rotatable member and a second rotatable member both of which are configured to disperse the residue when in said first orientation.

5. The agricultural harvesting system of claim 4, wherein said first rotatable member rotates in an opposite direction as said second rotatable member, yet in a generally coplanar arrangement when in said first orientation.

6. The agricultural harvesting system of claim 4, wherein said first rotatable member rotates and said second rotatable member rotate in generally parallel planes when in said second orientation.

7. The agricultural harvesting system of claim 4, wherein said first rotatable member and said second rotatable member each include a wheel with a tire.

8. The agricultural harvesting system of claim 7, wherein said first rotatable member and said second rotatable member each further include a spreader arrangement on one side of said wheel.

9. The agricultural harvesting system of claim 8, wherein said spreader arrangement extends along a side of said tire.

10. The agricultural harvesting system of claim 9, wherein said spreader arrangement is configured to be extendable beyond a circumference of said tire when in said first orientation and retractable within said circumference when in said second orientation.

11. A spreader system for discharging residue from an agricultural combine to a ground surface, the spreader system comprising at least one rotatable member positioned to encounter the residue and to disperse the residue when in a first orientation, said at least one rotatable member having a second orientation wherein said rotatable member is configured to contact the ground and to assist in providing support to the agricultural combine when in said second orientation.

12. The spreader system of claim 11, further comprising at least one pivotable member coupling said at least one rotatable member to the agricultural combine, the agricultural combine having a general direction of travel, said pivotal member having an axis about which said pivotal member pivots, said axis being generally parallel with a vertical plane oriented in the direction of travel.

13. The spreader system of claim 12, wherein said axis is generally horizontal.

14. The spreader system of claim 11, wherein said at least one rotatable member includes a first rotatable member and a second rotatable member both of which are configured to disperse the residue when in said first orientation.

15. The spreader system of claim 14, wherein said first rotatable member rotates in an opposite direction as said second rotatable member, yet in a generally coplanar arrangement when in said first orientation.

16. The spreader system of claim 14, wherein said first rotatable member rotates and said second rotatable member rotate in generally parallel planes when in said second orientation.

17. The spreader system of claim 14, wherein said first rotatable member and said second rotatable member each include a wheel with a tire.

18. The spreader system of claim 17, wherein said first rotatable member and said second rotatable member each further include a spreader arrangement on one side of said wheel.

19. The spreader system of claim 18, wherein said spreader arrangement extends along a side of said tire.

20. The spreader system of claim 19, wherein said spreader arrangement is configured to be extendable beyond a circumference of said tire when in said first orientation and retractable within said circumference when in said second orientation.

* * * * *